United States Patent
Carr et al.

(10) Patent No.: US 10,372,327 B2
(45) Date of Patent: Aug. 6, 2019

(54) CURSOR-BASED CHARACTER INPUT INTERFACE

(71) Applicant: INTERNATIONAL BUSINESS MACHINES CORPORATION, Armonk, NY (US)

(72) Inventors: Joshua M. Carr, Southampton (GB); Emma L. Foley, Banbury (GB); Josephine D. Messa, Broughton (GB); Thomas A. Wright, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 310 days.

(21) Appl. No.: 14/534,287

(22) Filed: Nov. 6, 2014

(65) Prior Publication Data

US 2015/0135123 A1    May 14, 2015

(30) Foreign Application Priority Data

Nov. 13, 2013  (GB) .................................. 1319985.6

(51) Int. Cl.
| | | |
|---|---|---|
| *G06F 3/0481* | (2013.01) | |
| *G06F 3/0488* | (2013.01) | |
| *G06F 3/023* | (2006.01) | |

(52) U.S. Cl.
CPC ........ *G06F 3/04886* (2013.01); *G06F 3/0237* (2013.01)

(58) Field of Classification Search
CPC ... G06F 3/04886; G06F 3/0236; G06F 3/0481
USPC ........................................................ 715/773
See application file for complete search history.

(56) References Cited

U.S. PATENT DOCUMENTS

| | | | |
|---|---|---|---|
| 5,574,482 A | 11/1996 | Niemeier | |
| 7,443,316 B2 * | 10/2008 | Lim ..................... | G06F 3/04886 341/22 |
| 8,490,008 B2 | 7/2013 | Griffin et al. | |
| 9,285,953 B2 * | 3/2016 | Kim ....................... | G06F 3/0236 |
| 2004/0139254 A1 | 7/2004 | Tu et al. | |
| 2010/0225599 A1 | 9/2010 | Danielsson et al. | |
| 2011/0078613 A1 | 3/2011 | Bangalore | |
| 2011/0099506 A1 | 4/2011 | Gargi et al. | |

(Continued)

FOREIGN PATENT DOCUMENTS

| | | |
|---|---|---|
| WO | 2004063918 | 7/2004 |
| WO | 2008137158 | 11/2008 |

OTHER PUBLICATIONS

C. Tam et al., "Perceived Benefits of Word Prediction Intervention on Written Productivity in Children with Spina Bifida and Hydrocephalus", Occupational Therapy International, 2002, vol. 9, No. 3, pp. 237-255. (Abstract Only).

(Continued)

*Primary Examiner* — Haoshian Shih
(74) *Attorney, Agent, or Firm* — Law Office of Jim Boice

(57) ABSTRACT

A cursor-based character input interface inputs a character selected by a cursor. A character prediction unit is adapted to predict one or more next characters based on a current input character, wherein the input interface is adapted to present the one or more predicted next characters as a supplementary interface in proximity to the current input character, and wherein the one or more predicted next characters of the supplementary interface are selectable by the cursor.

13 Claims, 6 Drawing Sheets

(56) References Cited

U.S. PATENT DOCUMENTS

| | | | |
|---|---|---|---|
| 2011/0119623 A1* | 5/2011 | Kim | G06F 3/0237 715/808 |
| 2012/0032886 A1* | 2/2012 | Ciesla | G06F 3/016 345/168 |
| 2013/0124962 A1* | 5/2013 | Mitchell | G06F 17/211 715/229 |

OTHER PUBLICATIONS

A. Moffat, "Implementing the PPM Data Compression Scheme", IEEE, Transactions on Communications, vol. 38, No. 11, Nov. 1990, pp. 1917-1921.
Anonymous, "Method and System for Automatically Re-arranging Keys of a Touch Sensitive Keyboard of a Portable Device", IP.com, IPCOM000207292D, May 24, 2011, pp. 1-6.

* cited by examiner

CURSOR-BASED CHARACTER INPUT INTERFACE

BACKGROUND

The invention relates to character input interfaces, and more particularly to cursor-based character input interfaces for electronic devices.

Hardware character input interfaces, such as keyboards, are typically designed to enable users to move quickly between input selections. Accordingly, it is not uncommon for a user of a physical keyboard to be able to type at 100+ words per minute.

A software-based (i.e. virtual) keyboard, on the other hand, may hamper the speed at which a user can move between input selections due to the selection method and/or physical input device(s) employed. For example, where the physical input device used to make input selections is a game controller, TV remote, or other device that has no inbuilt keyboard, a cursor is typically employed to make individual selections. Such an input interface which employs a cursor to make individual selections may be referred to as a cursor-based character input interface. The requirement to move a cursor in order to make individual selections greatly reduces the speed at which multiple input selections can be made. Accordingly, being able to type at anything higher than 5 words per minute is uncommon on such software-based (i.e. virtual) keyboards.

By way of example, if one considers typing the word "Hello" on a software-based QWERTY keyboard that uses a cursor to select individual characters in order (and with the cursor initially positioned on the letter "A") a user must press Right, Right, Right, Right, Right, Select, Left, Left, Left, Up, Select, Right, Right, Right, Right, Right, Right, Down, Select, Select, Up, Select. This represents a total of twenty-two (22) input commands.

SUMMARY

In an embodiment of the present invention, a cursor-based character input interface inputs a character selected by a cursor. A character prediction unit is adapted to predict one or more next characters based on a current input character, wherein the input interface is adapted to present the one or more predicted next characters as a supplementary interface in proximity to the current input character, and wherein the one or more predicted next characters of the supplementary interface are selectable by the cursor.

In an embodiment of the present invention, a processor-implemented method controls a cursor-based character input interface for inputting a character selected by a cursor. One or more processors predicts one or more next characters based on a current input character, and then presents the one or more predicted next characters as a supplementary interface in proximity to the current input character, wherein the one or more predicted next characters of the supplementary interface are selectable by the cursor.

In an embodiment of the present invention, a computer program product controls a cursor-based character input interface for inputting a character selected by a cursor, wherein said computer program product comprises a computer readable storage medium having program code embodied therewith, wherein said computer readable storage medium is not a transitory signal per se, and wherein said program code is readable and executable by a processor to perform a method comprising: predicting one or more next characters based on a current input character; and presenting the one or more predicted next characters as a supplementary interface in proximity to the current input character, wherein the one or more predicted next characters of the supplementary interface are selectable by the cursor.

BRIEF DESCRIPTION OF THE DRAWINGS

Embodiments of the invention will now be described, by way of example only, with reference to the accompanying drawings in which.

DETAILED DESCRIPTION

Figure 1A:
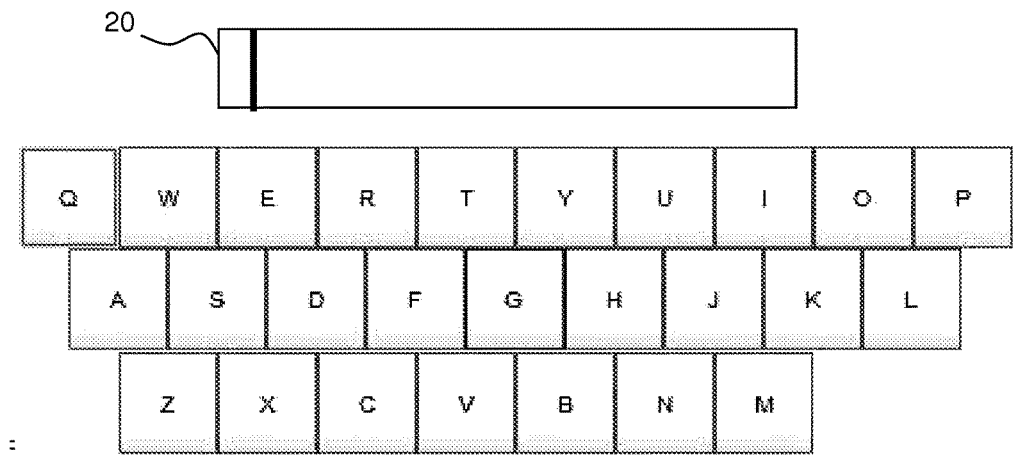
FIGS. 1A-1E depict a method of entering part of the word "HELLO" using a cursor-based character input interface according to an embodiment of the present subject matter.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Proposed is a concept for a cursor-based character input interface wherein alphanumeric characters are selected for input using a cursor that is movable between the available characters of the input interface. It is proposed to predict one or more next characters based on a current input character, and then present the one or more predicted next characters as a supplementary interface that is positioned close to (and potentially overlapping) the current input character. The one or more predicted next characters of the supplementary interface may then be selected for input by only needing to move the cursor from its current position by a minimal amount. Embodiments may therefore enable a user to reduce the amount of cursor movements and may even avoid the need to make any cursor movements between input characters. This will speed up the typing process when compared to conventional cursor-based character input interfaces.

For the purpose of embodiments according to the present subject matter, a current input character may be understood to be the last, latest or most recent character that has been input. In other words, a current input character may be considered to be the character highlighted at the time instant that the most recent input command (such as a "select" or "input" command, for example) was executed so as to input the highlighted character. A current input character may therefore be thought of as the last input character.

In known prior art, PPM is an adaptive statistical data compression technique based on context modeling and prediction. PPM models use a set of previous symbols in the uncompressed symbol stream to predict the next symbol in the stream. Because such next-character prediction methods are well known in the art, detailed description of such methods is omitted.

Referring to FIGS. 1A-1E, there is depicted a method of entering part of the word "HELLO" using a cursor-based character input interface 10 according to an embodiment of the present subject matter. The cursor-based character input interface comprises a software-based QWERTY keyboard wherein a character is selected for input using a movable cursor 25 (movable using a D-pad or joystick of a user input device for example) and then input using a "select" command button on a user input device.

The method starts as depicted in FIG. 1A with the cursor 25 positioned on character "G" and no characters having been input (as depicted by the display 20 which displays the inputted characters).

Figure 1B:
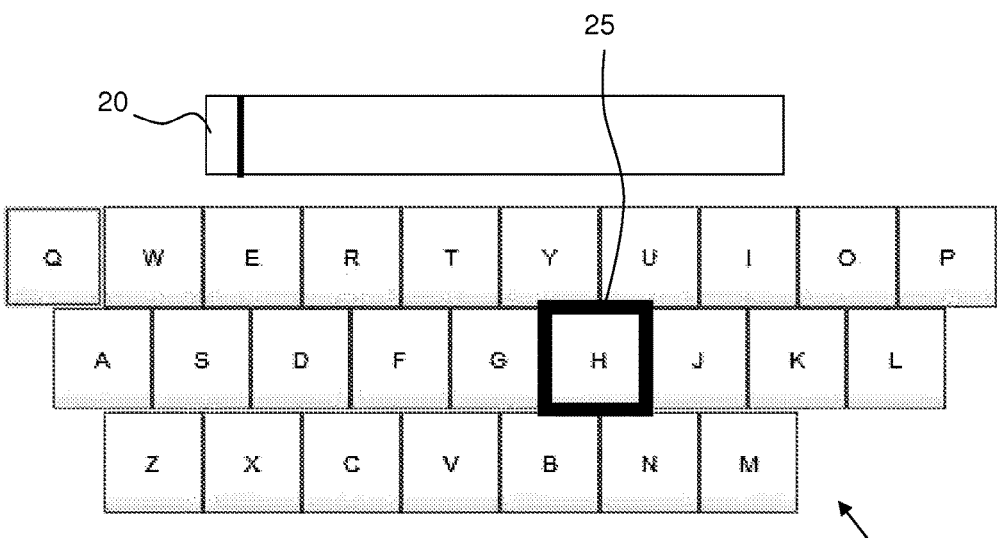
Figure 1C:
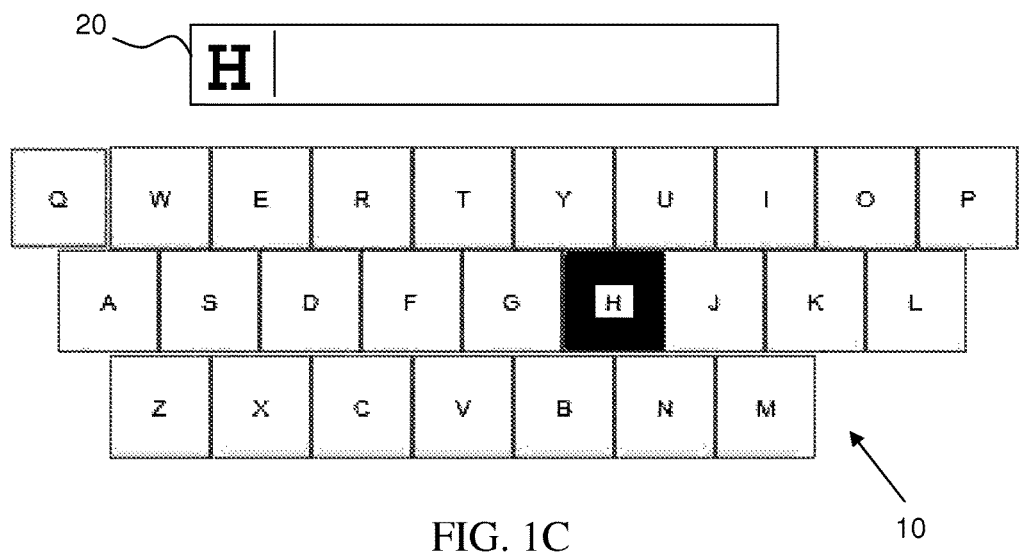

As depicted in FIG. 1B, the user moves the cursor 25 one step to the right (e.g. by pressing the "right" command button) so that the cursor 25 is then positioned on character "H". The user then inputs the character "H" by pressing the "select" command button (with the cursor positioned on character "H"), as shown in FIG. 1C. The character "H" is therefore considered as the "current input character" at this point since it is the last, latest or most recent character that has been input.

Figure 1D:
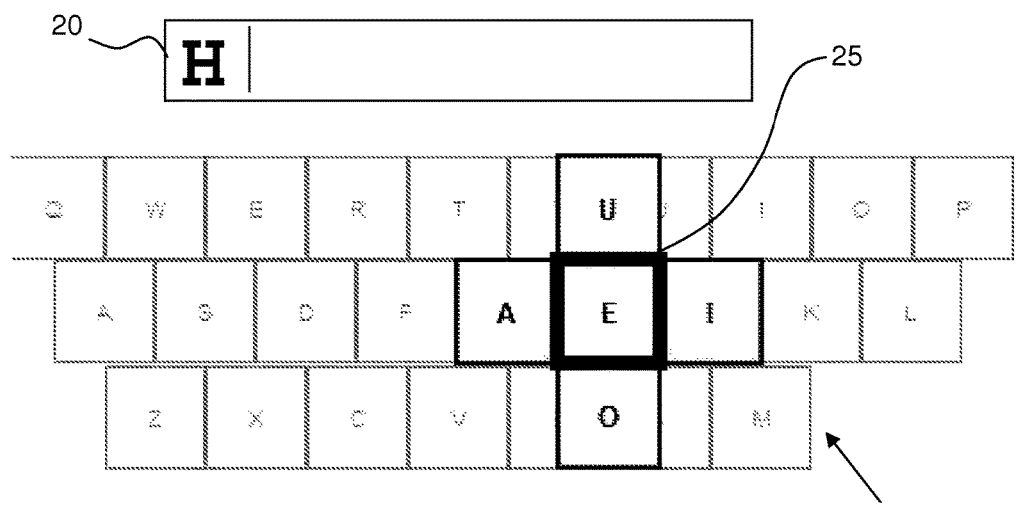

In response to inputting character "H", the input interface determines (using a known PPM model, for example) five characters having the greatest likelihood of being selected next. In other words, the input interface predicts the five most probable next input characters. These five characters are displayed to overlay the current selected character ("H") such that the most likely next character ("E") is positioned directly over the currently selected character ("H") and the four other predicted next characters are positioned so as to surround the most likely next character ("E") (in the up, down, left and right directions). Thus, as depicted in FIG. 1D, the five predicted next characters are presented as a supplementary interface that is positioned overlapping and adjacent to the currently selected character. These predicted characters of the overlay interface are selectable for input using the cursor 25.

Figure 1E:
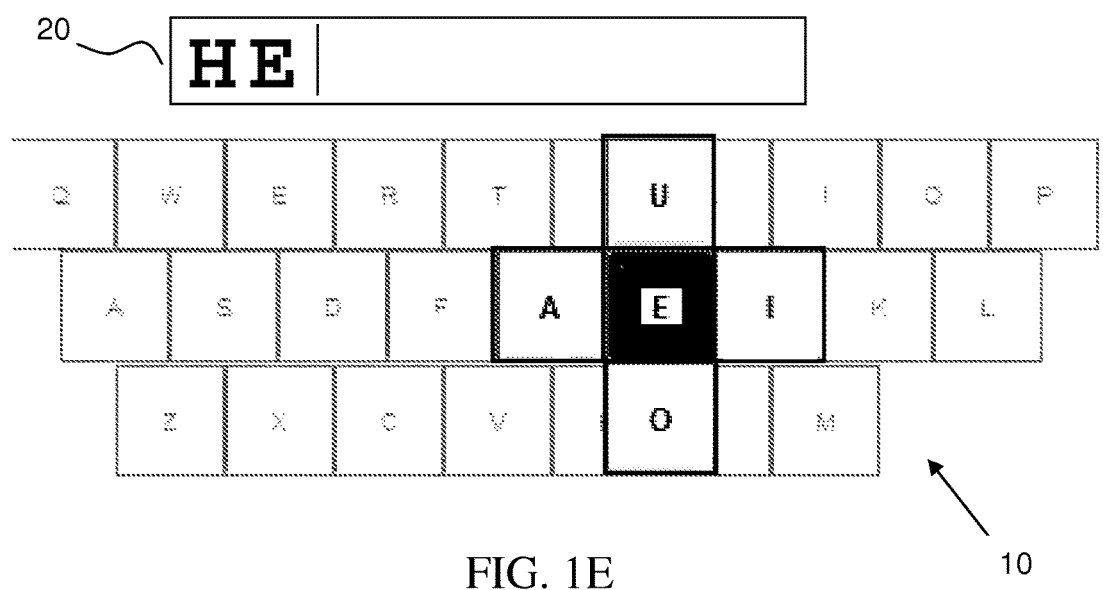

Since the next required character is "E" and the character "E" of the supplementary interface is arranged such that the cursor 25 is already positioned on character "E", the user does not need to move the cursor 25. Instead, as depicted in FIG. 1E, the user then inputs the character "E" by simply pressing the "select" command button.

This method continues with a new set of five predicted next characters being determined (using a known PPM model, for example) when a character is input. Here, after the character "E" is input, a supplementary interface is displayed which presents the character "L" to the right of cursor position (not shown). Thus, the user moves the cursor 25 to the right to select and input character "L". A new supplementary interface is then generated and displayed with the character "L" being positioned at the same position as the cursor 25, so the user simply presses the "select" command button to input the character "L" without needing to move the cursor 25. A new supplementary interface is then generated and displayed with the character "O" being positioned at the same position as the cursor 25, so the user then simply presses the "select" command button to input the final character "O" without needing to move the cursor 25. It will therefore be appreciated that the user only inputs seven (7) commands in total in order to type the word "HELLO" using a cursor-based character input interface 10 according to an embodiment of the present subject matter.

Figure 2A:
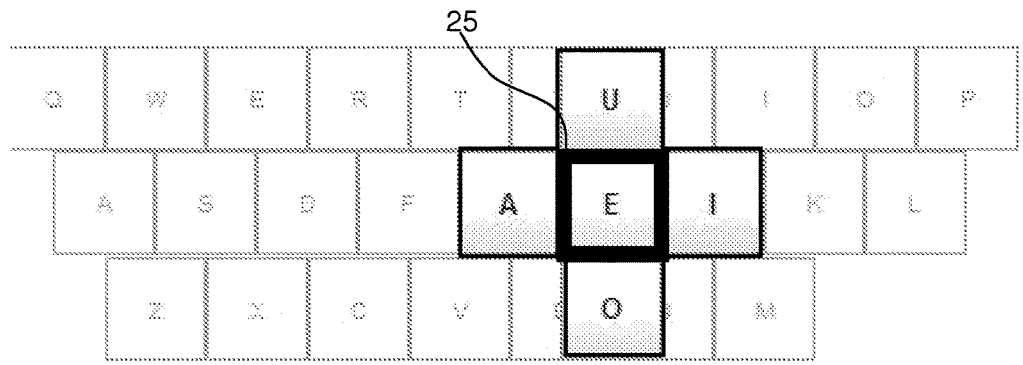
FIGS. 2A-2C depict a method according to an embodiment wherein the user desires to input a character which is not in the supplementary interface.
Figure 2B:
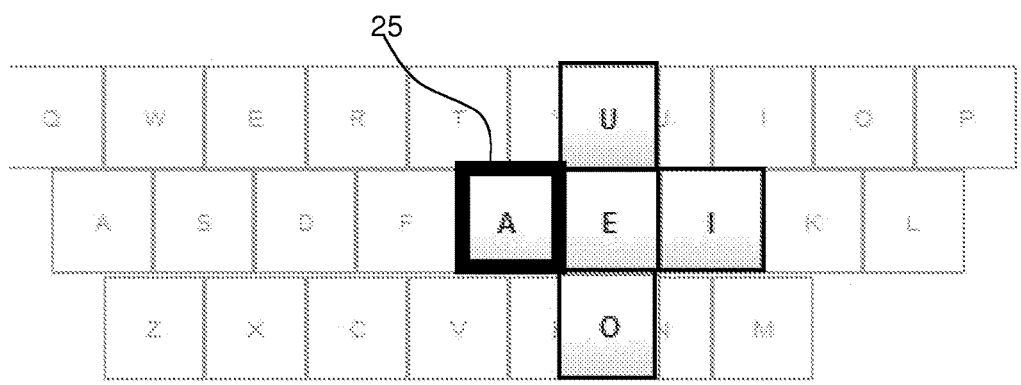
Figure 2C:
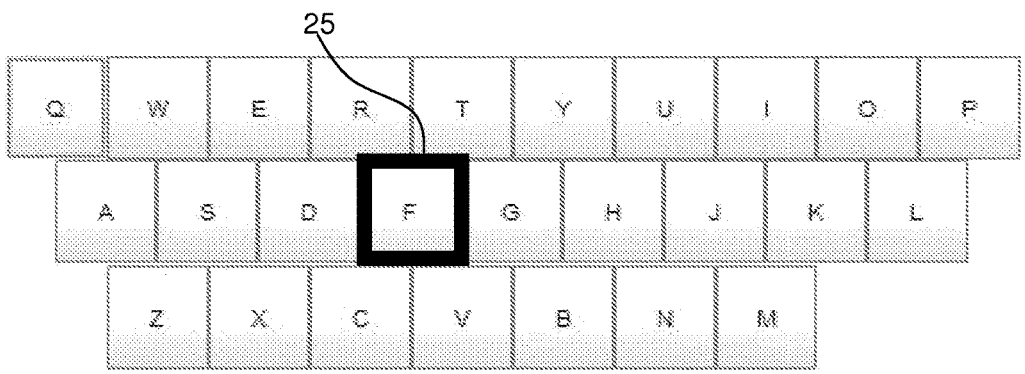

FIGS. 2A-2C depict a method according to an embodiment wherein the user desires to input a character which is not in the supplementary interface (e.g. not in the set of predicted next characters). In the situation that after entering the characters "HE" (as depicted by FIGS. 1A-1E) the user does not wish to input any of the predicted characters (A, E, I, O, U) displayed in the supplementary interface of FIG. 2A, the user can dismiss the supplementary interface by moving the cursor to a position outside of the supplementary interface. For example, the user may move the cursor 25 in the left direction (as shown in FIG. 2B) to highlight character "A" of the overlay interface, and then move the cursor 25 left once again (as shown in FIG. 2C) to highlight character "F" of the QWERTY keyboard interface and cause the supplementary interface to disappear.

It will be appreciated that other methods may be employed to dismiss the supplementary interface. For example, the user may press a command button (such as an "EXIT" or "BACK" button) on a user input device.

Figure 3:
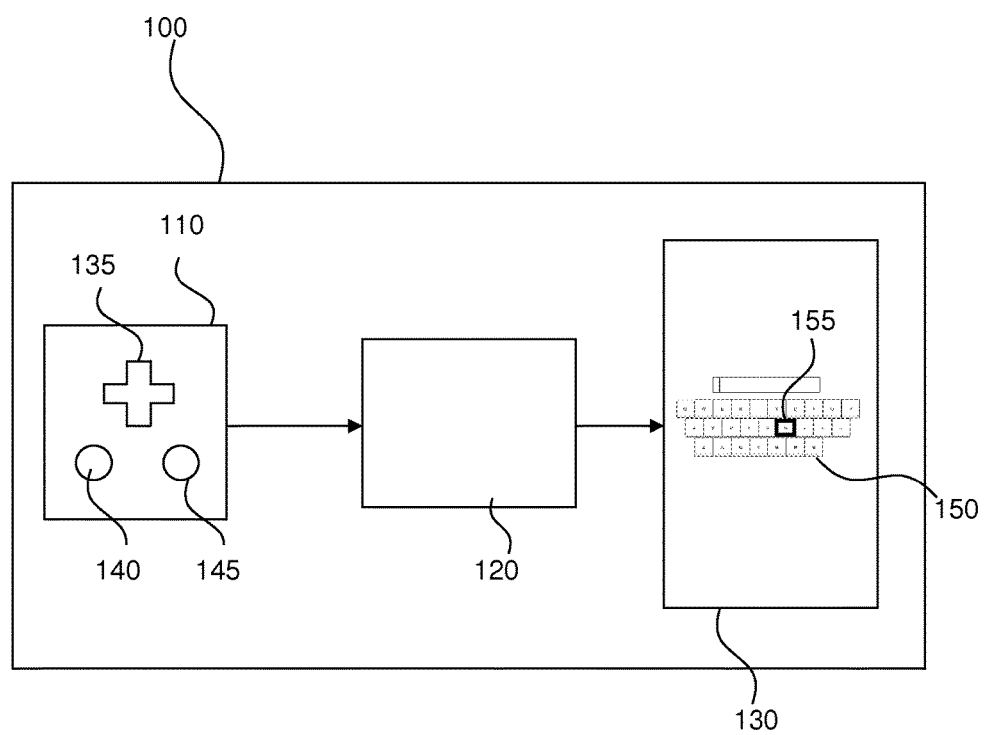
FIG. 3 is a schematic block diagram of an electronic device comprising a cursor-based character input interface according to an embodiment of the present subject matter.

FIG. 3 is a schematic block diagram of an electronic device 100 comprising a cursor-based character input interface according to an embodiment of the present subject matter. The electronic device comprises a user input interface 110, a processing unit 120 and a display 130.

The user input interface 110 comprises a D-pad 135 adapted to move a cursor of the cursor-based character input interface in accordance with the direction(s) indicated by one or more user presses of the D-pad 135. The user input interface also comprises first 140 and second 145 command buttons. The first command button 140 is adapted to act as a "select" command button so that it causes the interface to input a character highlighted by the cursor when pressed by a user. The second command button 145 is adapted to act as an "exit" command button so that it causes a supplementary interface of the cursor-based character input interface to disappear when pressed by a user. Thus, the user input interface 110 is adapted to enable a user to control the cursor-based character input interface and input characters.

The processing unit 120 is adapted to receive signals from the user input interface 110, process the received signals, and then output display signals for the display 130 to render.

The display unit 130 is adapted to receive display signals from the processing unit 120 and render/display the cursor-based character input interface. Here, the displayed cursor-based character input interface comprises a virtual QWERTY keyboard 150 wherein a character is selected using a movable cursor 155.

A user uses the D-pad 135 of user input interface 110 to move the cursor 155 displayed on the display unit 130 so as to highlight a character to input. The user then inputs the highlighted character by pressing the first command button 140.

In response to a highlighted character being input, the processing unit 120 determines a set of predicted next characters based on the input character. The processing unit then modifies the display signals for the display 130 so as to cause the display to render the set of predicted next characters as a supplementary interface in proximity to the input character. In other words, the processing unit 120 modifies the displayed character input interface so as to present the predicted next characters close to the current position of the cursors. The predicted next characters may then be selected by the cursor, and due to being situated near the previously input character (and thus the cursor) a predicted next character may be highlighted by the cursor by only moving the cursor a small or minimal amount.

In the situation that none of the predicted next characters rendered in proximity to the input character are required to be input next, the user may press the second command button 145 to instruct the processing unit 120 that the predicted next characters are not required and thus cause the processing unit 120 to modify the display signals to remove the supplementary interface from the displayed character input interface. Furthermore, the processing unit 120 may store information relating to the fact that none of the predicted next characters are required. Such information may be used by the processing unit 120 to improve next character prediction for subsequently input characters.

Figure 4:
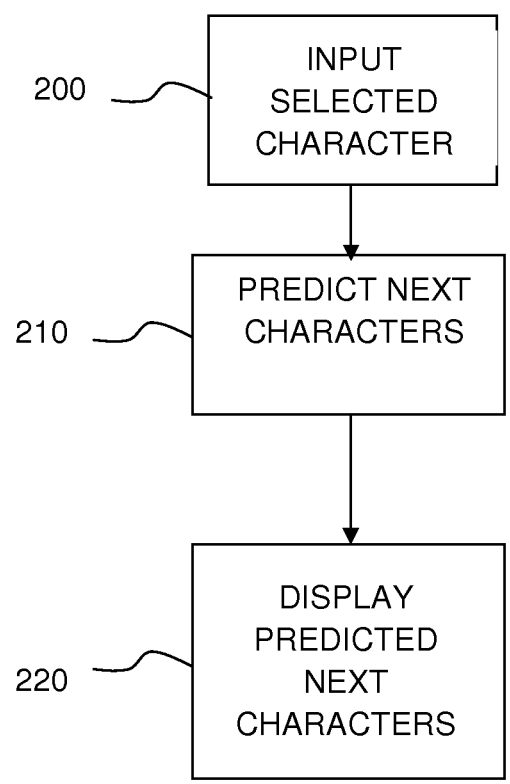
FIG. 4 is a flow chart of an example of an implementation of a method according to an embodiment of the present subject matter.

FIG. 4 is a flow chart of an example of an implementation of a method according to an embodiment of the present subject matter. The method begins in step 200 wherein a user uses the cursor of a cursor-based character input interface to select and input a character. Based on the input character, a plurality of next characters is predicted in step 210. The predicted next characters are the characters that are deemed the most likely to be desired to be input next (i.e. directly after the currently selected character, assuming the cursor has not been moved from the inputted character). Here, it may be preferable to limit the number of predicted next characters to five in total.

Next, in step 220, the plurality of predicted next characters is presented as a supplementary interface that overlaps the location of the previously input character. For the preferred situation that the number of predicted next character is limited to five, the supplementary interface is positioned so that the most likely next character is in the current location of the cursor (i.e. overlays the previously input character) and the four next most likely characters are adjacent the current location of the cursor in the up, down, left and right directions, respectively. In this way, the most likely next character is positioned such that it is already highlighted by the cursor and can be input by simply entering an input command without needing to move the cursor. Similarly, the four next most likely characters are positioned such that they can be highlighted by the cursor for input by only needing to move the cursor once from its current location (of the previously input character). Thus, the predicted next characters are presented as a supplementary interface which is positioned such that the predicted next characters may be selected for input by only needing to move the cursor from its current position by a small or minimal amount.

Proposed is a cursor-based character input interface for inputting a character selected by a cursor. The input interface comprises a character prediction unit adapted to predict one or more next characters based on a current input character. The input interface is adapted to present the one or more predicted next characters as a supplementary interface in proximity to the current input character, the one or more predicted next characters of the supplementary interface being selectable by the cursor.

According to an aspect of the invention, there is provided a cursor-based character input interface for inputting a character selected by a cursor, the input interface comprising: a character prediction unit adapted to predict one or more next characters based on a current input character, and wherein the input interface is adapted to present the one or more predicted next characters as a supplementary interface in proximity to the current input character, the one or more predicted next characters of the supplementary interface being selectable by the cursor.

Embodiments may thus reduce the amount by which a cursor needs to be moved between input selections, thereby reducing the number of user inputs and/or time taken to make multiple input selections. Testing has demonstrated that embodiments may enable a user to input words at speeds in excess of thirty (30) words per minute.

In an embodiment, the cursor-based character input interface may comprise a software-based (i.e. virtual) keyboard.

The supplementary interface may be positioned such that the one or more predicted next characters can be selected by moving the cursor no more than once from the current input character. A predicted next character may therefore be selected by a single movement of the cursor.

Further, the supplementary interface may be positioned such that at least one of the one or more predicted next characters at least partially overlaps the current input character. A predicted next character that at least partially overlaps the current input character may therefore be selected without even needing to move the cursor from its current position.

Embodiments may thus provide a concept for generating a supplementary interface comprising predicted next characters adjacent and/or overlapping a current input character of a software-based keyboard, wherein a user selects a character by moving a cursor.

According to another aspect of the invention, there is provided a method of controlling a cursor-based character input interface for inputting a character selected by a cursor, the method comprising: predicting one or more next characters based on a current input character; and presenting the one or more predicted next characters as a supplementary interface in proximity to the current input character, the one or more predicted next characters of the supplementary interface being selectable by the cursor.

According to yet another aspect of the invention, there is provided a computer program product for controlling a cursor-based character input interface for inputting a character selected by a cursor, wherein the computer program product comprises a computer-readable storage medium having computer-readable program code embodied therewith, the computer-readable program code configured to perform all of the steps of a method according to an embodiment of the invention.

Embodiments may provide an electronic device comprising a cursor-based character input interface according to an embodiment of the invention.

Other embodiments may be employed in a display device.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A cursor-based character hardware input interface for inputting a character selected by a cursor, the cursor-based character hardware input interface comprising:
    a character prediction unit adapted to predict multiple next characters based on a current input character, wherein the cursor-based character hardware input interface is adapted to present the multiple predicted next characters as a supplementary interface in proximity to the current input character, wherein a most likely predicted next character is overlaid directly on top of the current input character such that the most likely predicted next character completely overlaps the current input character, and wherein only next most likely characters that are less likely than the most likely predicted next character to be a next character are displayed adjacent to but not overlapping the current input character, and
    one or more processors configured to:
        detect a user selection of a next character that is outside of an area used to display the supplementary interface on the cursor-based character input interface, wherein the next character that is outside of the area used to display the supplemental interface is displayed at an original position on an initial keyboard that is displayed on the cursor-based character input interface; and
        in response to detecting the user selection of the next character that is outside of the area used to display the supplementary interface, remove the supplementary interface from the cursor-based character input interface.

2. The cursor-based character hardware input interface of claim 1, wherein the cursor-based character hardware input interface comprises a software-based keyboard.

3. The cursor-based character hardware input interface of claim 1, wherein the supplementary interface is positioned such that the multiple predicted next characters are selected by moving the cursor no more than once from the current input character.

4. The cursor-based character hardware input interface of claim 3, wherein the supplementary interface is positioned such that at least one of the multiple predicted next characters at least partially overlaps the current input character.

5. The cursor-based character hardware input interface of claim 1, further adapted to remove the supplementary interface in response to an input command indicating that none of the multiple predicted next characters are required to be input next.

6. A method of controlling a cursor-based character input interface for inputting a character selected by a cursor, the method comprising:

predicting, by one or more processors, multiple next characters based on a current input character;

presenting, by one or more processors, the multiple predicted next characters as a supplementary interface in proximity to the current input character, wherein the multiple predicted next characters of the supplementary interface are selectable by the cursor, wherein a most likely predicted next character is overlaid directly on top of the current input character such that the most likely predicted next character completely overlaps the current input character, and wherein only next most likely characters that are less likely than the most likely predicted next character to be a next character are displayed adjacent to but not overlapping the most likely predicted next character;

detecting, by one or more processors, a user selection of a next character that is outside of an area used to display the supplementary interface on the cursor-based character input interface, wherein the next character that is outside of the area used to display the supplemental interface is displayed at an original position on an initial keyboard that is displayed on the cursor-based character input interface; and in response to detecting the user selection of the next character that is outside of the area used to display the supplementary interface, removing, by one or more processors, the supplementary interface from the cursor-based character input interface.

7. The method of claim 6, wherein the cursor-based character input interface comprises a software-based keyboard.

8. The method of claim 6, wherein said presenting the multiple predicted next characters comprises positioning the supplementary interface such that the multiple predicted next characters are selected by moving the cursor no more than once from the current input character.

9. The method of claim 6, further comprising:

receiving, by one or more processors, a user input that selects one of the multiple predicted next characters; and displaying, on a hardware display, the one of the multiple predicted next characters that are selected by the user input.

10. The method of claim 6, further comprising:

removing, by one or more processors, the supplementary interface in response to an input command indicating that none of the multiple predicted next characters are required to be input next.

11. A text input system comprising:

a screen for displaying an image of a keyboard;

a cursor for pointing to keys of the keyboard;

a cursor moving device coupled to the screen for moving the cursor to keys of the keyboard in response to a manual input from a user;

a key selecting device for selecting a key of the keyboard, wherein the key is pointed to by the cursor in response to the manual input;

a text predicting engine for identifying possible next keys to follow a selected key based on possible words that include a preceding key selection;

an overlay generator coupled to the text predicting engine for generating an overlay image of identified possible next keys identified by the text predicting engine, wherein the overlay image is displayed on the screen over the selected key, wherein the overlay image disappears in response to a selection of a next key selected by the user, and wherein the next key was previously presented outside of the overlay image at an original position for the next key on the keyboard.

12. The method of claim 6, further comprising:

receiving, by one or more processors, a user input from a user indicating that the user does not select any of the multiple predicted next characters; and adjusting, by one or more processors, future predicted next characters for the current input character by removing one or more of the multiple predicted next characters not selected by the user from future predicted next characters for the current input character.

13. The method of claim 6, wherein the most likely predicted next character is displayed on a first keyboard key on a keyboard on a display, and wherein the characters that are less likely than the most likely predicted next character to be the next character are displayed on other keyboard keys that are adjacent to the first keyboard key on the keyboard.

* * * * *